UNITED STATES PATENT OFFICE.

GEORGE P. MARINER, OF PHILADELPHIA, PENNSYLVANIA.

FOOD PRODUCT.

1,142,346.  Specification of Letters Patent.  Patented June 8, 1915.

No Drawing.    Application filed October 23, 1914.  Serial No. 868,214.

*To all whom it may concern:*

Be it known that I, GEORGE P. MARINER, a citizen of the United States, residing in the city of Philadelphia, county of Philadelphia, and State of Pennsylvania, have invented an Improved Food Product, of which the following is a specification.

My invention is a food product comprising the combination of peanuts, cocoa, and sugar for the purpose of producing a palatable and nutritive paste.

A desideratum attained by my invention, in addition to incorporating all of the valuable ingredients of the constituents, is the production of a product having a peculiarly delicious flavor.

In practice, I prefer to combine six parts of whole roasted peanuts, one part of unsweetened, roasted and powdered cocoa, and one part of powdered sugar. The thoroughly and uniformly mixed ingredients are then passed through a grinding mill from which they are discharged in the form of a paste, which is placed in containers and sealed for distribution to users. It is characteristic of my invention that this solid product in the form of a paste is produced without the use of heat, water, or other solvent, which change the characteristic properties of the ingredients.

Having described my invention, I claim:

1. The food product comprising the combination of disintegrated and intimately mixed roasted peanuts, roasted cocoa and sugar.

2. The food product comprising the combination of disintegrated and intimately mixed roasted peanuts in the proportion of six parts, roasted cocoa one part, and powdered sugar one part.

3. The food product comprising a paste composed of disintegrated and intimately mixed roasted peanuts, roasted cocoa and powdered sugar.

In testimony whereof I have hereunto set my name this 16th day of October, 1914, in the presence of the subscribing witnesses.

GEO. P. MARINER.

Witnesses:
    Jos. G. DENNY, Jr.,
    C. W. BUTLER.